(12) United States Patent
Kawai et al.

(10) Patent No.: US 6,891,636 B1
(45) Date of Patent: May 10, 2005

(54) IMAGE FORMING SYSTEM

(75) Inventors: Atsushi Kawai, Toyokawa (JP); Masazumi Ito, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/533,211

(22) Filed: Mar. 23, 2000

(30) Foreign Application Priority Data

Mar. 30, 1999 (JP) .............................................. 11-088981
Mar. 1, 2000 (JP) ....................................... 2000-055825

(51) Int. Cl.$^7$ .............................................. G06F 15/00
(52) U.S. Cl. .................... 358/1.18; 358/1.12; 358/1.15; 358/501; 399/6
(58) Field of Search .............................. 358/1.18, 1.12, 358/1.15, 501, 450, 540; 399/6, 194, 1, 2, 3, 79, 43; 705/14, 52, 53, 77, 79

(56) References Cited

U.S. PATENT DOCUMENTS 4,839,829 A  *  6/1989  Freedman ................... 345/751
5,513,254 A  *  4/1996  Markowitz ............. 379/100.17

FOREIGN PATENT DOCUMENTS

JP           9-90832       4/1997
JP           9-212051      8/1997

* cited by examiner

Primary Examiner—Twyler Lamb
(74) Attorney, Agent, or Firm—McDermott Will & Emery LLP

(57) ABSTRACT

An image forming system having a copying machine capable of printing advertisement images by means of adding them to document images and a fee charging device for charging the copying fee to the user. The image forming system can alter the copying fee to be charged to the user and the advertisement fee to be charged to the advertiser depending on the time required for forming the advertisement image. When an advertisement image is formed on the backside of a sheet where a document image is formed or on a separate sheet, the time required to form the advertisement image becomes longer so that the user has to suffer a drop in the copying productivity. The copying fee in such a case where the copying productivity drops, the image forming system reduces the copying fee and raise the advertisement fee by the same amount.

10 Claims, 12 Drawing Sheets

FIG. 11

| COLOR MODE FOR ADVERTISEMENT IMAGE / COLOR MODE FOR DOCUMENT COPY | FULL COLOR | MONOCHROMATIC | NO ADVERTISEMENT PRINTING |
|---|---|---|---|
| FULL COLOR | A  USER 40 YEN  ADVERTISER 10 YEN | C  USER 40 YEN  ADVERTISER 10 YEN | E  USER 50 YEN  ADVERTISER 0 YEN |
| MONOCHROMATIC | B  USER 7 YEN  ADVERTISER 23 YEN | D  USER 10 YEN  ADVERTISER 10 YEN | F  USER 20 YEN  ADVERTISER 0 YEN |

IMAGE FORMING SYSTEM

This application is based on Japanese Patent Application No. 11-88981 filed on Mar. 30, 1999 and Japanese Patent Application No. 2000-55825 filed on Mar. 1, 2000, the contents of which are hereby incorporated by reference.

BACKGROUND OF THE INVENTION

1. Field of the Invention

The present invention relates to an image forming system that adds previously stored images to scanned images to be printed.

2. Description of the Related Art

As a part of the recent trend of popularization of copying machines, we see copying machines equipped with fee collecting devices installed at various public places such as convenience stores. These copying machines are used by unspecified users. Therefore, if certain advertisement images are added to the users' scanned document images, the providers of such advertisements can achieve certain advertisement effects.

Under the circumstance, various image-forming systems have been proposed. For example, the Publication of Unexamined Patent Application No. JP-A-9-90832 discloses an apparatus that merges and prints advertisement images on white spaces with scanned images. This apparatus determines automatically the ratios between the copying fee to be charged to the user and the advertisement fee to be charged to the advertiser depending on the number of printed pages and the ratio as well as its location of the advertisement image relative to the total printed image.

However, the above apparatus assumes printing of advertisement images in white spaces of printed pages. Therefore, if the user does not wish merging of advertisements with document images or the pages do not have any white space, it is impossible to print advertisement images even if the user wanted. Moreover, advertisement images have to be relatively small to fit into limited areas of white spaces, so that advertisement effects are also limited. Larger advertisement images attract more attentions of viewers, and their effects will be greater.

This leads us to the idea of printing large advertisements on the backside of the sheet on which the document image is printed or on a separate sheet. However, printing on the backside of a printed sheet or on a separate sheet makes the printing time longer and reduces the productivity of printing. As a result, the user may choose to stay away from the benefit of advertisement printing function to avoid the reduction of the productivity. The apparatus disclosed by the above publication fails to recognize the need for altering the fees to the user as well as to the advertiser based oh the productivity.

SUMMARY OF THE INVENTION

It is an object of the present invention to provide an image forming system having a printing unit for forming additional images in addition to document images, and an alteration means for altering printing fees for the document images based on times required for forming the additional images.

It is other object of the present invention to provide an image forming system having a printing unit for forming additional images in addition to document images, and a mode selection unit for selecting an additional image mode that forms only the additional images without printing any document images.

A further object of the invention is to provide an image forming system including a memory unit that stores multiple additional images, a printing unit for forming additional images selected from multiple additional images in addition to document images, and an alteration means for altering printing fees for the document images based on the selected additional images.

Still a further object of the invention is to provide an image forming system including a printing unit for forming additional images in addition to document images, an alteration means for altering printing fees for the document images when the additional images are formed, and a display unit for displaying information concerning the printing fees altered by the alteration means.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 2A shows a format where only the document image is printed, FIG. 2B shows a format where an advertisement image is printed on the white space, and FIG. 2C shows a format where an advertisement image is printed either on the backside of the printed sheet or on a separate sheet;

FIG. 11 is a table showing an example of a fee based on the combination of the color modes.

DETAILED DESCRIPTION OF THE PREFERRED EMBODIMENT

The embodiments of this invention will be described below with reference to the accompanying drawings.

Figure 1:
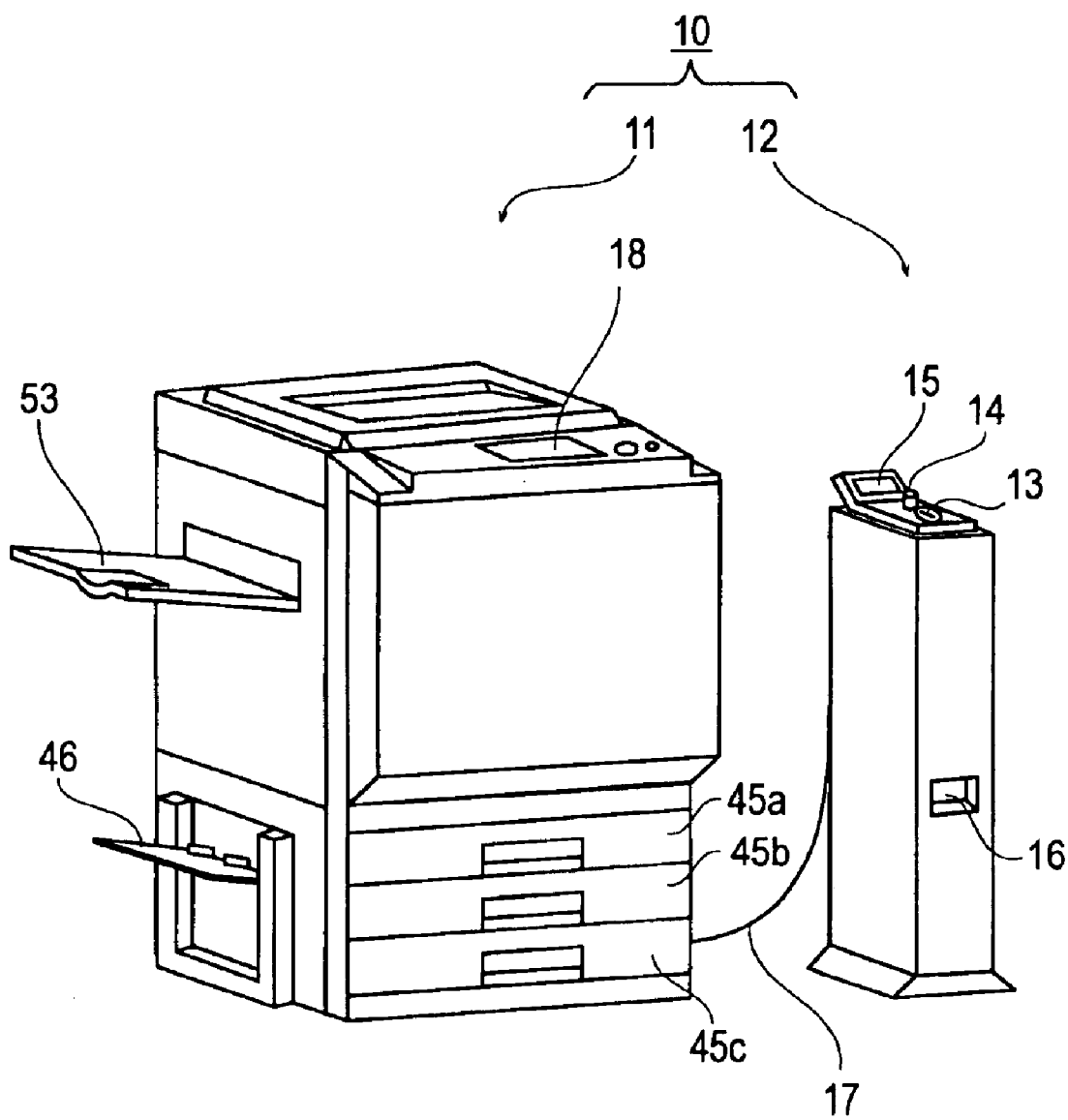
FIG. 1 is a perspective view of an image forming system according to the embodiment of the present invention.

An image forming system 10 shown in FIG. 1 is typically installed in a public space such as a convenience store and is intended to be used by unspecified users. An image forming system 10 comprises a copying machine 11 and a fee charging device 12 that charges a fee to the user. The fee charging device 12 is essentially a coin vender. The user deposits coins into the fee charging device 12 to be allowed to operate the copying machine 11 to produce copies of documents. The fee charging device 12 displays the amount of money deposited. The fee charging device 12 allows operation of the copying machine 11 based on the amount of money deposited and collects the copying fee when copying is completed. The fee charging device 12 displays anew the amount after subtraction, i.e., the balance. The copying fee to be collected varies with the copying mode, such as the registered number (the number of copies), the size of paper, and the color mode (monochromatic/color copy). When the balance becomes less than the specified amount, the fee charging device 12 disapproves the copying operation of the copying machine 11. When additional coins are deposited, the fee charging device 12 allows again the copying operation of the copying machine 11. Thus, the fee charging device 12 has the function of instructing operation of the copying machine 11 approval or disapproval of the copying operation while managing the copying fee and the balance.

To be more specific, the fee charging device 12 has an oblong box shape. On its top surface, the fee charging device 12 provides a coin depositing port 13, a coin return push-button 14 for instructing it to return the coins deposited, and a display panel 15 consisting of a liquid crystal, etc. The display panel 15 displays the deposited amount and the balance among other things. The front surface is provided with a coin return port 16. The fee charging device 12 is connected to the copying machine 11 via a relaying connector 17, which extends from its back.

The copying machine 11 and the fee charging device 12 communicate with each other via the relaying connector 17. The copying machine 11 sends the fee charging device 12 various information concerning in-copying process signal, paper feed signal, paper discharge signal, copy mode signal, etc. on the other hand, the fee charging device 12 sends the copying machine 11 various information such as copy approval, copy disapproval, and deposit amount. The copying machine 11 is controlled to be a copy enabled or disabled condition depending on various information received or sent. Provided on the top surface of the copying machine 11 is an operating panel 18. The user specifies the copy mode on the operating panel 18.

The fee charging device 12 calculates a necessary copy fee from various information such as copy mode and determines if it should enable copying based on the comparison between the fee and the deposited amount. If it determines to enable copying, it sends the copy approval signal to the copying machine 11. Upon receipt of the copy approval signal, the copying machine 11 will be set to the copy enabled status.

When the user presses the start key (not shown) on the operating panel 18, the copying machine 11 starts the prescribed copying operation. The copying machine 11 sends the fee charging device 12 the discharge information when the paper is discharged to a discharge tray 53. The fee charging device 12 collects the copying fee. As the copying fee is collected each time a page is printed and the balance becomes less than the amount for printing the next page, the fee charging device 12 sends the copying machine 11 the copy disapproval signal. Upon receiving the copy disapproval signal, the copying machine 11 will be set to the copy disabled status.

Although a coin vendor is exemplified as the fee charging device 12 in the drawing, it can be replaced with a fee charging device using information storage media such as prepaid card, which stores monetary value information. In such a case, the fee charging device collects the copying fee from the balance data stored in the prepaid card inserted into the device.

Figure 2A:
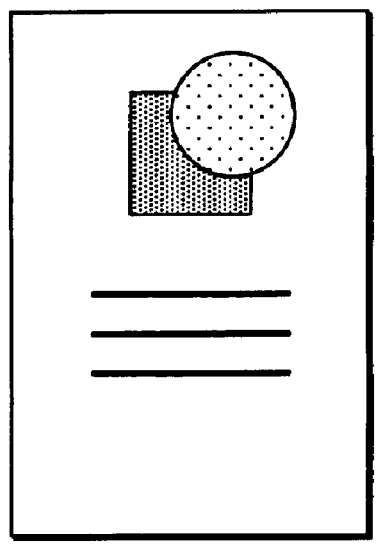
FIGS. 2A, 2B and 2C drawings for describing various formats of printing according to the image forming system, where
Figure 2B:
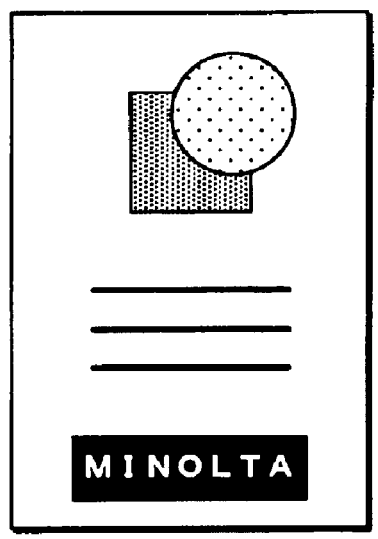
Figure 2C:
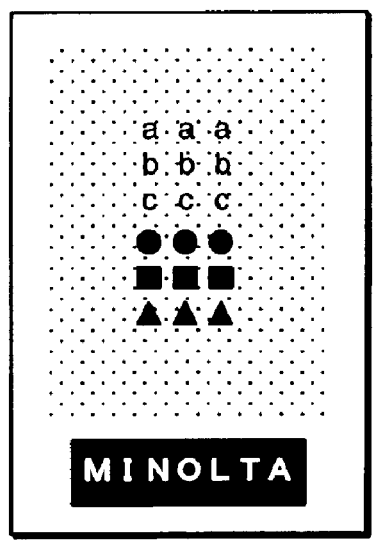

Now, let us describe the printing format using the image forming system 10 referring to FIGS. 2A, 2B and 2C.

The image forming system 10 can either print only document images without printing advertisement images as shown in FIG. 2A, or print advertisement images as well as shown in FIGS. 2B and 2C if the user wants. FIG. 2B shows a format where a white space is detected on a document image page, in which an advertisement is printed. In the case shown, the white space used is located at the bottom of the page. FIG. 2C is a case where a full page size advertisement is printed on the backside of a printed sheet or on a separate sheet. In order to identify these cases, we will call an advertisement printed in a white space as "white space advertisement," an advertisement printed on a separate sheet as "separate sheet advertisement," and an advertisement printed on the backside of a page where a document image is printed as "backside advertisement" in this specification.

Since "separate sheet advertisement" and "backside advertisement" can be selected arbitrarily, it is possible to print advertisements if the user wants, even if the user does not wish to merge advertisements with document images or when there is no white space. Moreover, since the separate sheet advertisement or the backside advertisement can be a full size advertisement, a large advertisement effect can be achieved.

However, when the copying machine 11 is to print a separate sheet advertisement, it requires to feed and discharge a separate sheet in addition to the image forming, and, when it is to print a backside advertisement, it requires to switch back the sheet in addition to the image forming. For this reason, when a separate sheet advertisement or a backside advertisement is printed, the time required to form the advertisement image becomes longer than the time for printing a white space advertisement, so that the user has to suffer a drop in the copying productivity.

Therefore, the image forming system 10 according to this embodiment is intended to cause users who do not mind productivity reduction to use advertisements in the format shown in FIG. 2C more willingly. As a consequence, the image forming system 10 charges the user a fee in proportion to the printing of the document image and the advertiser a fee in proportion to the advertisement image provided based on the copying productivity as it prints the advertisement image and/or the document image. More specifically, when its copying productivity drops due to printing the separate sheet advertisement or the backside advertisement, it charges the advertiser a fee that is reflective of the effectiveness of advertisement it provides, while it charges the user a copying fee that is reflective of the demerit, i.e., the copying productivity reduction due to advertisement printing. With such a fee charging system, enhancement of the advertisement effect as well as promotion of the user's active use of advertisement printing can be achieved.

It depends on each advertiser whether a larger advertisement image with complex contents or a smaller advertisement image with simple contents is desired. It is not fair to charge the advertiser a fixed fee regardless of the degree of advertisement effect. Therefore, it is preferable to determine the advertiser's fee, as well as the copying fee depending on the advertisement image selected by the user or how complex the contents of the advertisement image is. For this reason, the image forming system 10 charges the advertiser a fee commensurate with the degree of the advertisement effect, and discounts the copying fee charged to the user by the same amount. With such a fee charging system, the objective of maintaining the fairness among the advertisers as well as promoting the user's active use of advertisement printing can be achieved.

In some cases, users may want to print advertisement images only with no document images at all. Therefore, the image forming system 10 is capable of selecting a mode in which only advertisement images are printed without printing any document pages. If such a mode is selected, the image forming system 10 charges a fee only to the advertiser. Thus a user can obtain only the desired advertisement information even if the user does not have any documents to copy. This will drastically increase the use of the copying machine and the benefits of the users.

On a color copying machine, there may be a need for determining fees to the user and the advertiser depending on the combination of the color mode of the advertisement image to be printed and the color mode of the document copy selected by the user. For example, if the user wants to print the document image in the monochromatic mode and the advertisement image happens to be in the full color printing mode, the user gets a full color advertisement in the white space of the monochromatic document page invariably, being forced to accept a low productivity unwillingly. This is due to the fact that monochromatic copying is faster than color copying. Therefore, the image forming system 10 varies the fees to the user and the advertiser based on the judgment whether the copying productivity is affected or not. Such a fee charging system can also promote the user's active use of the advertisement printing.

Moreover, in order to maintain fairness in treating advertisers, it is necessary to consider the printing materials (e.g., toner) used for printing advertisement images. For this reason, the image forming system 10 varies the fee for the advertiser based on the amount of the toner used in printing advertisement images. Such a fee charging system considering the amount of toner used in printing advertisement images can maintain fairness among advertisers.

Figure 3:
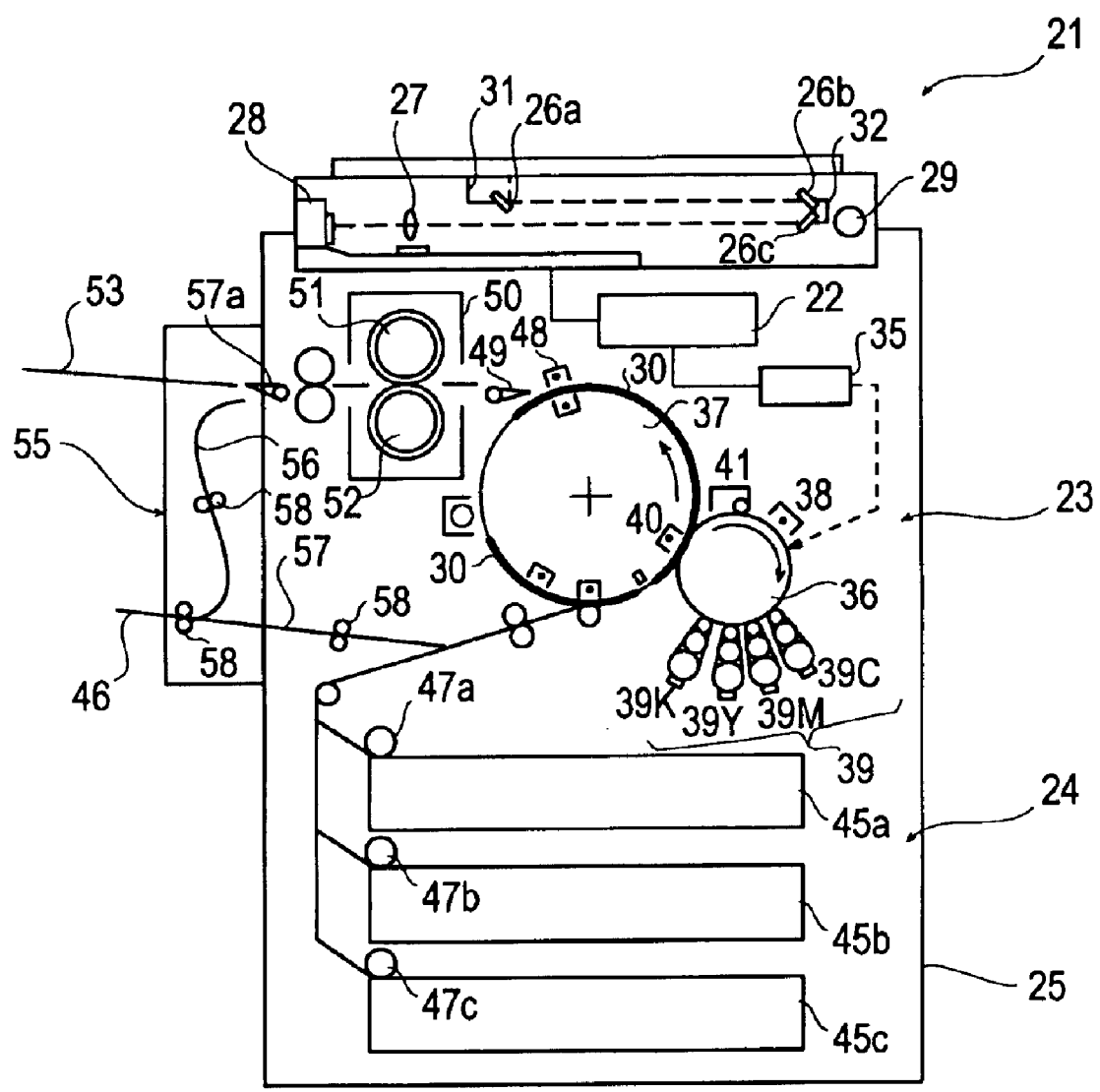
FIG. 3 is a diagram which schematically shows the internal constitution of a copying machine of the image forming system.

Let us now describe the schematic constitution of the copying machine 11 referring to FIG. 3.

The copying machine 11 is a four cycle type full color copying machine. It consists of an image scanner unit 21 for scanning document images, a signal processing unit 22 for processing signals scanned by the image scanner unit, a printer unit 23 for printing images that correspond the scanned document images on printing paper, a paper cassette 24 for storing printing paper, and a casing 25 for enclosing the above units.

In the image scanner unit 21, a document placed on the platen glass is illuminated by a lamp. The light bounced off from the document is focused on a line sensor (CCD) 28 via multiple mirrors 26a, 26b, and 26c and a condenser lens 27. A first scanner 31 scans with a velocity of V and a second scanner 32 scans with a velocity of V/2 both driven mechanically over the document surface in a perpendicular direction (vertical scanning direction) against the electrical scanning direction (horizontal scanning direction) of the line sensor 28.

The signal processing unit 22 receives input signals from the line sensor 28, generates image signals by means of electrically treating input signals, and send image signals to the printer unit 23.

The printer unit 23 is equipped with a laser generator 35, a photoconductor drum 36, and a transfer drum 37, to the outer circumference of which paper 30 adheres. The photoconductor drum 36 rotates in the direction indicated by the arrow. Arranged on the periphery of the photoconductor drum 36 along the direction of its rotation are an electric charger 38 for electrically charging the photoconductor drum 36, a developing device 39 (integration of developers 39C, 39M, 39Y, and 39K) for developing electrostatic latent images formed on the photoconductor drum 36, a transfer charger 40 for transferring the developed toner images onto paper 30, and a cleaning device 41 for removing the toner remaining on the photoconductor drum 36. The developer 39C stores cyan (C) toner, and developers 39M, 39Y and 39K store magenta (M) toner, yellow (Y) toner, and black (K) toner respectively. The laser generator 35 drives and modulates the semiconductor laser according to the image signal level received from the signal processing unit 22. Laser light is cast on the photoconductor drum 36 at a position between the electric charger 38 and the developing device 39 after passing through a polygon mirror, an f-θ lens, a reversing mirror (all of these are not shown). Electrostatic latent images formed on the photoconductor drum 36 are developed by the toner at the developing device 39.

The paper cassette 24 has multiple (three in the example shown) cassettes 45a, 45b and 45c. Each of these cassettes 45a, 45b and 45c has multiple sheets of paper of different sizes and different orientations. The copying machine 11 is also equipped with a manual feed tray 46 which allows paper to be fed manually. Paper stored in each of these cassettes 45a, 45b and 45c is fed sheet by sheet by means of paper feed rollers 47a, 47b and 47c and adheres to the outer circumference of the transfer drum 37. The paper on the manual feed tray 46 is fed when manual paper feeding is desired. The image developed on the photoconductor drum 36 is transferred onto paper 30.

If the copy mode is monochromatic, the recording process consisting of image forming, developing and transfer is performed only once using black (K) toner on the copying machine 11 shown in the figure. If the copy mode is full color, however, the recording process consisting of image forming, developing and transfer is performed for each color toner. In other words, the transfer drum 37 rotates four times, overlaying basic color images of cyan (C), magenta (M), yellow (Y), and black (K) one on top of the other to form a full color image on paper 30 adhering on the transfer drum 37. It is also possible to perform mono-color printing using only one of cyan (C), magenta (M), and yellow (Y). In case of mono-color printing, the recording process is performed only once similar to the case of monochromatic printing in black (K).

The paper will be separated from the transfer drum 37 after image forming by means of a separation charger 48 and a separation claw 49, and will be sent to a fixing device 50. The fixing device 50 is equipped with a fixing roller 51 and a pressurizing roller 52. The fixing roller 51 has a heat source such as a built-in halogen heater lamp. The pressurizing roller 52 presses against the fixing roller 51 across the paper. The toner, which has been transferred onto the paper but not yet fixed, becomes a permanent image when it is heated and melted by means of the fixing device 50. The paper with fixed toner is discharged on the discharge tray 53.

The copying machine 11 is capable of double side copying and is equipped with a paper turnover mechanism 55 that overturns the paper, which has been printed with some images. The paper turnover mechanism 55 has a reversing path 56 for transporting the paper from the fixing device 50 for double side copying, a switching claw 57a for selectively switching the delivery destination from the discharge tray 53 to the reversing path 56, or vice versa, a paper transport route 57 connecting with the manual feed tray 46, and multiple transport rollers 58. The paper transported to the reversing path 56 adheres again to the transfer drum 37 with the side already printed being the backside and the second side yet to be printed being the front side.

Figure 4:
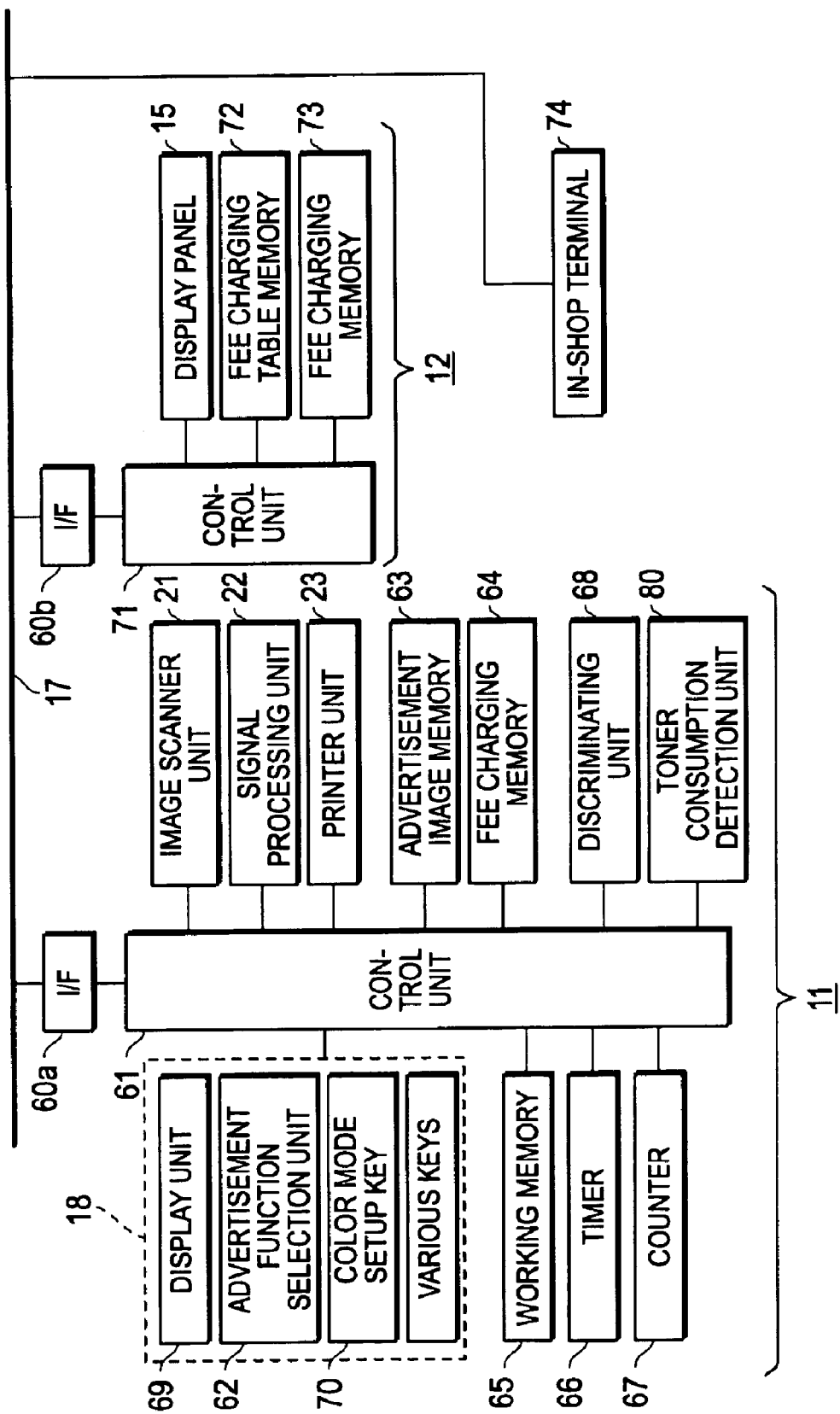
FIG. 4 is an outline block diagram for the control system of the image forming system.

Now, let us describe the control system of the image forming system 10 referring to FIG. 4.

The copying machine 11 and the fee charging device 12 communicate with each other via the relaying connector 17 and input/output interfaces 60a and 60b. A control unit 61 of the copying machine 11 is connected with the image scanner unit 21, the signal processing unit 22 and the printer unit 23. The operating panel 18 containing an advertisement function selection unit 62 is also connected to the control unit 61. The control unit 61 is further connected with an advertisement image memory 63 for storing multiple advertisement images in advance, a fee charging memory 64 for storing the aggregate number of copies printed with advertisements as well as the aggregate fees to be charged to the advertiser, a working memory 65 used for temporary storage of image data and for image synthesizing, a timer 66 for detecting current time, a counter 67 for counting aggregately the number of sheets printed with advertisement, a discriminating unit 68 for discriminating the productivity of printing advertisement images and/or document images, and a toner consumption detection unit 80 that detects the amount of toner used in printing advertisement images. The control unit 61 controls various parts of the copying machine 11 as well as the communication between it and the fee charging device 12.

The fee charged to the advertiser is stored as an aggregate amount in the fee charging memory 64. The fee charging information to the advertiser can be obtained as a lump sum for a predetermined period. The sum stored as an aggregate amount as one of the fee information is an invoice amount to the advertiser. The stored invoice amount is invoiced to the advertiser as a lump sum for each predetermined period.

The operating panel 18 comprises a number registering key for specifying the number of copies to be made, a color mode setup key 70 for setting the document image printing color mode (monochromatic copy/color copy), keys for selecting or setting other copy modes (e.g., two-sided copy, scale up/down copy, etc.), a start key, and a display unit 69. The display unit 69 displays the setup status, the list of advertisements that can be printed, and other information. One area of the operating panel 18 is dedicated for the advertisement function selection unit 62.

The advertisement function selection unit 62 has a key for selecting whether or not to allow advertisements to be printed, a key for selecting which of the white space advertisement, separate sheet advertisement or backside advertisement mode to be used for printing advertisements, and a key for the user to select desired advertisements among multiple advertisements. Also provided, is a key for selecting advertisement printing only without printing any document images at all. Each of these keys is a touch panel type key. By means of operating the advertisement function selection unit 62, the user can select advertisement printing, select advertisement images of the user's choice among multiple advertisement images, and select to print only advertisement images.

The display unit 69 displays various information concerning copy fees. When the user's fee reduces (copying fee reduces) due to printing advertisement images, the control unit 61 displays said information on the display unit 69. For example, it shows messages such as "Your copy fee is reduced by (XX) yen" or "Your total printing fee is reduced by (YY) yen." It is preferable to indicate the reduction amount for each copy and the aggregate amount of reduction specifically. Since copying fee reduction amount is displayed in the display unit 69, the user can be further motivated for the use of the advertisement printing.

A control unit 71 of the fee charging device 12 is connected with the display panel 15, a fee charging table memory 72, and a fee charging memory 73 for storing the aggregate number of copies and the aggregate fee to be charged to the user. The control unit 71 is in charge of the control of various parts of the fee charging device 12 as well as the communication control between it and the copying machine 11.

The fee charging table memory 72 stores the first through third fee tables. The first fee table shows the fees to the user and the advertiser in correspondence to the copying productivity. The second fee table shows the fees according to the densities of advertisement images. The third table shows the fees based on the combination of the color mode of the document images and the color mode of the advertisement images. The control unit 71 charges fees to the user and the advertiser referencing the necessary tables depending on the copying operation executed.

The image forming system 10 is connected to a terminal 74 in the store where the particular the image forming system 10 is installed. By means of operating this terminal 74, the shopkeeper can check the current condition of the copying machine 11 such as the current balances of paper and toner, advertisement usage status, fees to be charged to the advertisers, etc. The shopkeeper can also alter the advertisement images to be selected by the users by remote control depending on the age and sex of the users.

The image forming system 10 can be connected via a network (not shown) to a terminal located in the management facility. The management facility centrally controls the image forming systems installed at multiple shops. The management facility can monitor the operating condition of each image forming system, invoices the advertiser based on the aggregate fee information from each image forming system, replace the advertisement images stored in the copying machine remotely and regularly.

Let us now describe the control for altering the fees to be charged to the user and the advertiser.

[1. Fee Control Based on Copying Productivity (Separate Sheet Advertisement/White Space Advertisement)]

Figure 5:
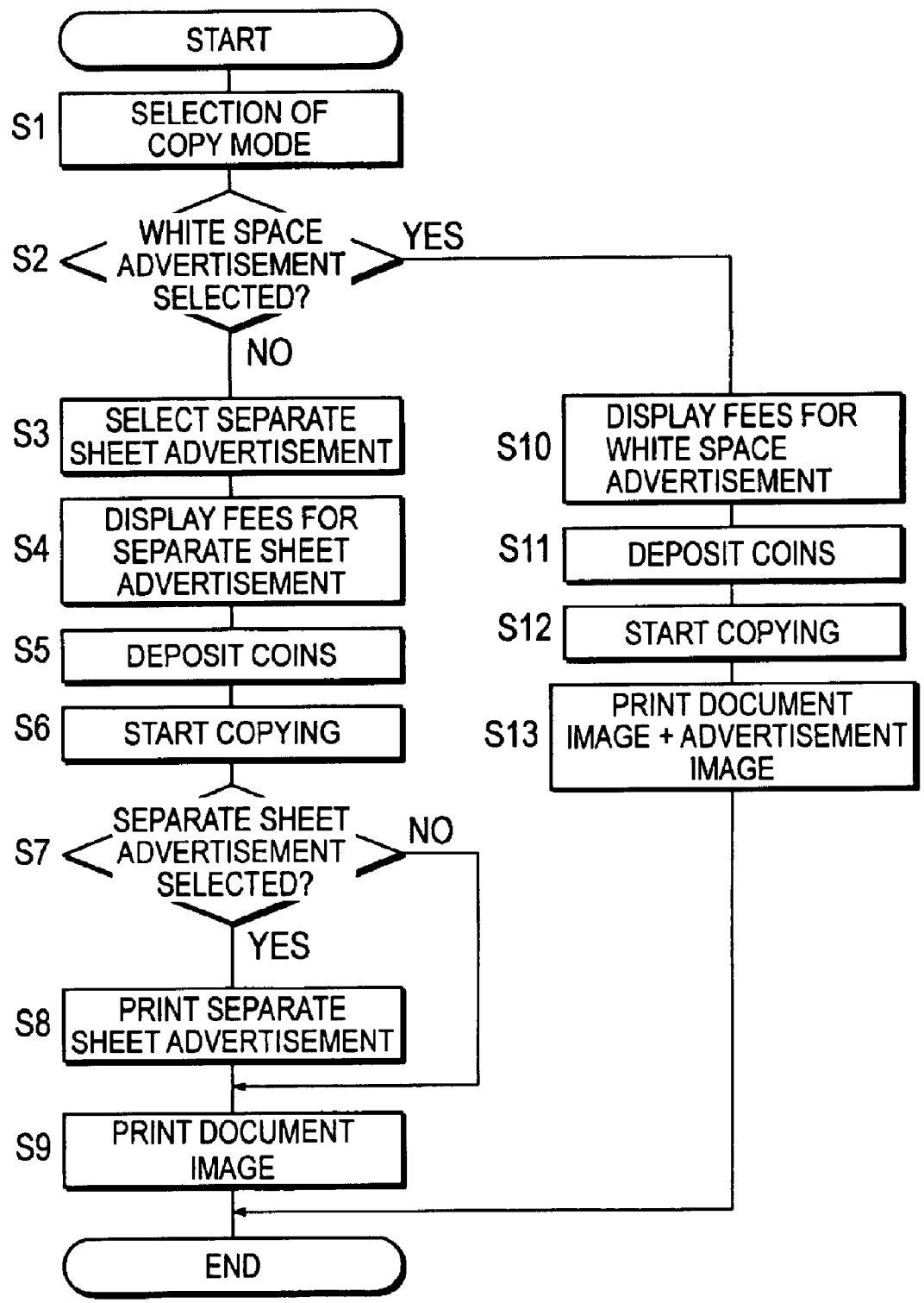
FIG. 5 and FIG. 6 are flow charts for fee control procedures based on the copying productivity.

The control procedure for altering the fee based on the copying productivity is described in the following referring the flow chart shown in FIG. 5. The fees to the user and the advertiser are determined and altered based on whether the time spent for forming advertisement images is large, i.e., whether the copying productivity is reduced.

The normal color copying fee where no advertisement image is printed is, for example, set to 50 yen per copy. When the separate sheet advertisement is selected, the copying fee is set lower than the normal fee, for example, at 40 yen per copy. When a separate sheet advertisement is printed, the copying productivity drops and the user has to wait longer for the copy to be completed. The copying fee in this case is set lower than the normal fee in order to compensate for this inconvenience. The copying fee reduction amount (50 yen−40 yen=10 yen in the above example) for selecting the separate sheet advertisement printing is charged to the advertiser as the advertisement fee. The normal fee (50 yen), the user's fee (40 yen) when the separate sheet advertisement is selected, and the advertiser's fee (10 yen) are stored in the fee charging table memory 72 of the fee charging device 12 as the first fee table. On the other hand, in case of the white space advertisement, the copying productivity remains unaltered since the document image and the advertisement image are printed at the same time. Therefore, the color copying fee when the white space copying is selected is set to 45 yen, which is 5 yen less than the normal fee, 50 yen. The discounted amount, 5 yen, is charged as the advertisement fee to the advertiser. The user's fee (45 yen) and the advertiser's fee (5 yen) are also stored in the fee charging table memory 72 as the first fee table.

The user first specifies the desired copy mode by him/herself (S1). The user can select the advertisement printing by operating the keys of the advertisement function selection unit 62. When the separate sheet advertisement is selected, not the white space advertisement (S2 "NO", S3), the discriminating unit 68 determines that the separate sheet advertisement is selected, which reduces the copying productivity. The information that the separate sheet advertisement is selected is sent to the fee charging device 12 from the copying machine 11. The control unit 71 of the fee charging device 12 displays on the display panel 15 the copying fee per copy for the separate sheet advertisement (40 yen in the above example) referring to the first fee table stored in the fee charging table memory 72 (S4). This information is sent to the copying machine 11 and the copying fee is displayed on the display unit 69 of the operating panel 18. The copying fee can be displayed only on either the display panel 15 or the display unit 69.

When the user deposits coins into the fee charging device 12 (S5) and presses the start key, the copying machine 11 starts the copying operation depending on the copy mode selected (S6).

When it is determined the separate sheet advertisement is selected (S7 "YES"), the separate sheet advertisement will be printed first (S8). The reason for this is that the user may not take the sheet printed with the separate sheet advertisement with him/her if the advertisement is printed last. The advertisement can be printed first or in the middle of the document printing. The printed advertisement image is the image stored in the advertisement image memory 63 in advance. After printing the separate sheet advertisement is completed, it starts to print the document image (S9). When the document printing is completed, the printed paper will be discharged to complete the copying operation.

On the other hand, when the white space advertisement is selected (S2 "YES"), the control unit 71 displays the copying fee per copy for the white space advertisement (45 yen in the above example) on the display panel 15 (S10). Next, when processes (S11, S12) similar to steps S5 and S6 are conducted, the advertisement image will be added to the document image to print the white space advertisement (S13). The copying fee when the white space is selected is higher than the copying fee for the separate sheet advertisement. This is due to that fact that the white space printing does not cause any copying productivity drop.

The fee charging device 12 collects the copying fee from the amount of money deposited. The fee charging memory 64 of the copying machine 11 remembers the aggregate number of copies printed with advertisements and fees. The aggregate advertisement fees will be invoiced to the advertiser later as a lump sum.

As described above, when the separate sheet advertisement is selected the copying productivity reduces, so that the copying fee is altered to a fee lower than that of the white space advertisement, and the advertisement fee is altered to a fee higher than that of the white space fee. Since the separate sheet advertisement is larger in size, it can attract more attentions from the user than the white space advertisement, so that it can bring a better advertisement effect. Therefore, while the advertiser is charged a fee that is commensurate with the better advertisement effect, the user is charged a fee that compensates the demerit for the copying productivity drop. The fees to the user and the advertiser can thus be altered in a proper ratio based on the copying productivity. This fee charging control causes the user to willingly select the printing of separate sheet advertisements whenever the user wishes to make color copying at a less expensive fee. Thus, the active use of separate sheet advertisement can be promoted.

If the number of copies of the separate sheet advertisement is higher, the copying fee can be further reduced from the above-mentioned 40 yen per copy, because the higher the number of copies of the separate sheet advertisement, the copying production becomes lower.

[2. Fee Control Based on Copying Productivity (Backside Advertisement/White Space Advertisement)]

Figure 6:
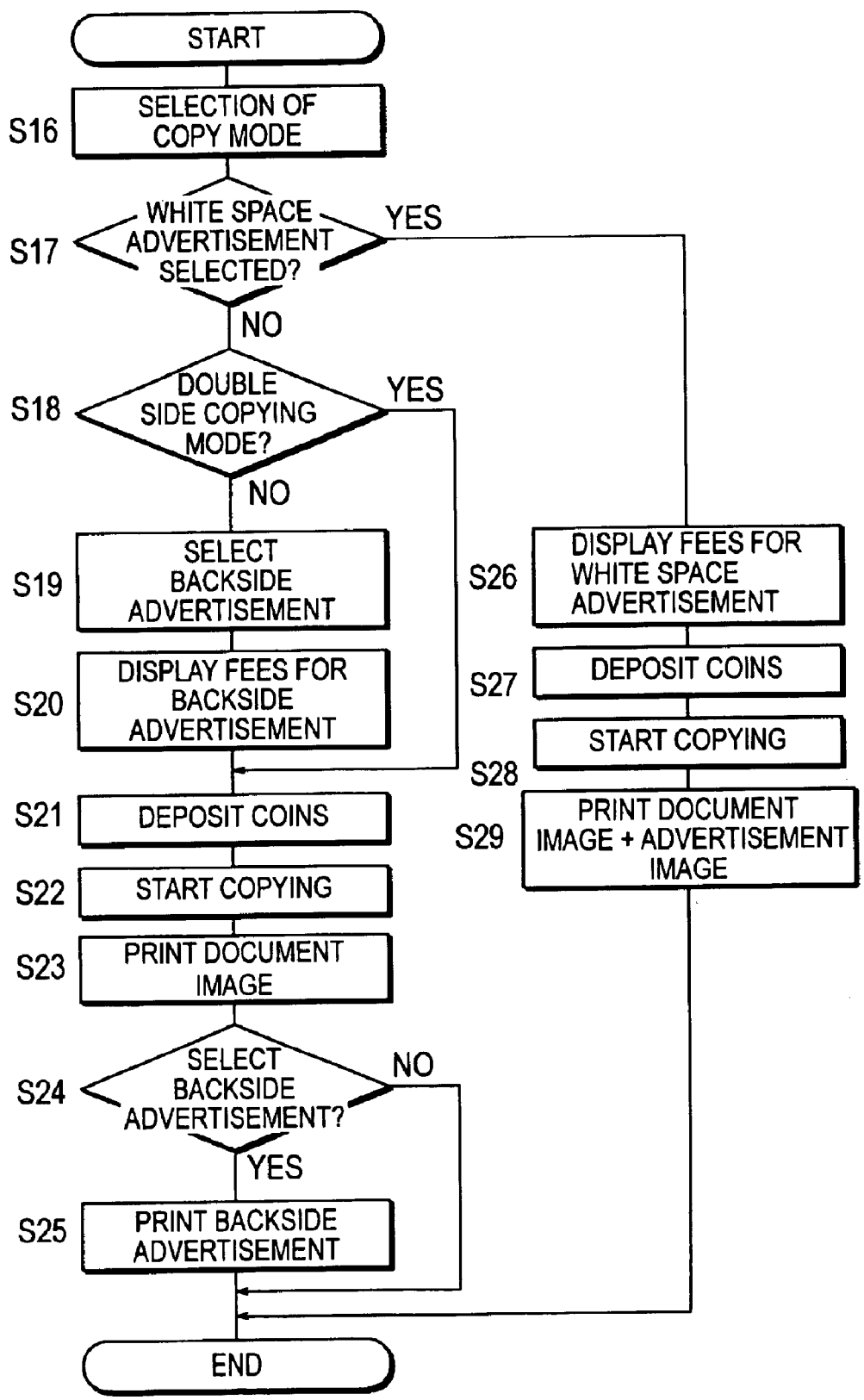

The control procedure for altering the fee based on the copying productivity is described in the following referring the flow chart shown in FIG. 6. The fees to the user and the advertiser are determined and altered based on whether the copying productivity is reduced.

As described above, the normal color copying amount is set as 50 yen per copy. When the backside advertisement is selected, the copying fee is set lower than the normal fee, for example, at 40 yen per copy. When a backside advertisement is printed, the copying productivity drops so that the user has to wait longer for the copy to be completed. The copying fee in this case is set lower than the normal fee in order to compensate for this inconvenience. The copying fee reduction amount (50 yen−40 yen=10 yen in the above example) for selecting the backside advertisement printing is charged to the advertiser as the advertisement fee. The normal fee (50 yen), the user's fee (40 yen) when the backside advertisement is selected, and the advertiser's fee (10 yen) are stored, in the fee charging table memory 72 as the first fee table. On the other hand, in case of the white space advertisement, the copying productivity remains unaltered as described before, the color copying fee when the white space copying is selected is set to 45 yen. The discounted amount, 5 yen, is charged as the advertisement fee to the advertiser.

The user first specifies the desired copy mode (S16). When the white space advertisement is not selected (S17 "NO") and the copying mode is not the double side copying mode (S18 "NO"), the user can select the backside advertisement by operating the keys on the advertisement function selection unit 62. When the backside advertisement is selected (S19), the discriminating unit 68 determines that the backside advertisement is selected, which reduces the copying productivity. The information that the backside advertisement is selected is sent to the fee charging device 12 from the copying machine 11. The control unit 71 displays on the display panel 15 and/or the display unit 69 the copying fee per copy for the backside advertisement (40 yen in the above example) referring to the first fee table stored (S20).

When the user deposits coins into the fee charging, device 12 (S21) and presses the start key, the copying machine 11 starts the copying operation depending on the copy mode selected (S22).

First, the document image is printed on the front side of the paper (S23). Next, it is determined that the backside advertisement is selected,(S24 "YES"), the paper that has been printed with the document image is turned over by means of the paper turnover mechanism 55 and adheres again to the transfer drum 37. The backside advertisement is then printed on the backside of the paper (S25). When the backside advertisement printing is finished, the printed paper will be discharged to complete the copying operation.

On the other hand, when the white space advertisement is selected (S17 "YES"), the control unit 71 displays the copying fee per copy for the white space advertisement (45 yen in the above example) on the display panel 15 (S26). Next, when processes (S27, S28) similar to steps S21 and S22 are conducted, the advertisement image will be added to the document image to print the white space advertisement (S29). The copying fee when the white space is selected is higher than the copying fee for the backside advertisement. This is due to that fact that the white space printing does not cause any copying productivity drop.

The copying fee to the user is collected by the fee charging device 12. The advertisement fee to the advertiser is stored aggregately in the fee charging memory 64 and will be invoiced later to the advertiser as a lump sum.

As described above, when the backside advertisement is selected, the copying productivity reduces, so that the copying fee is altered to a fee lower than that of the white space advertisement, and the advertisement fee is altered to a fee higher than that of the white space fee. Since the backside advertisement is larger in size, it can attract more attentions from the user than the white space advertisement, so that it can bring a better advertisement effect. Therefore, while the advertiser is charged a fee that is commensurate with the better advertisement effect, the user is charged a fee that compensates the demerit for the copying productivity drop. The fees to the user and the advertiser can thus be altered in a proper ratio based on the copying productivity. This fee charging control causes the user to willingly select the printing of backside advertisements whenever the user wishes to make color copying at a less expensive fee. Thus, the active use of backside advertisement can be promoted.

[3. Fee Charging Control Based on the Contents of Advertisement]

Figure 7:
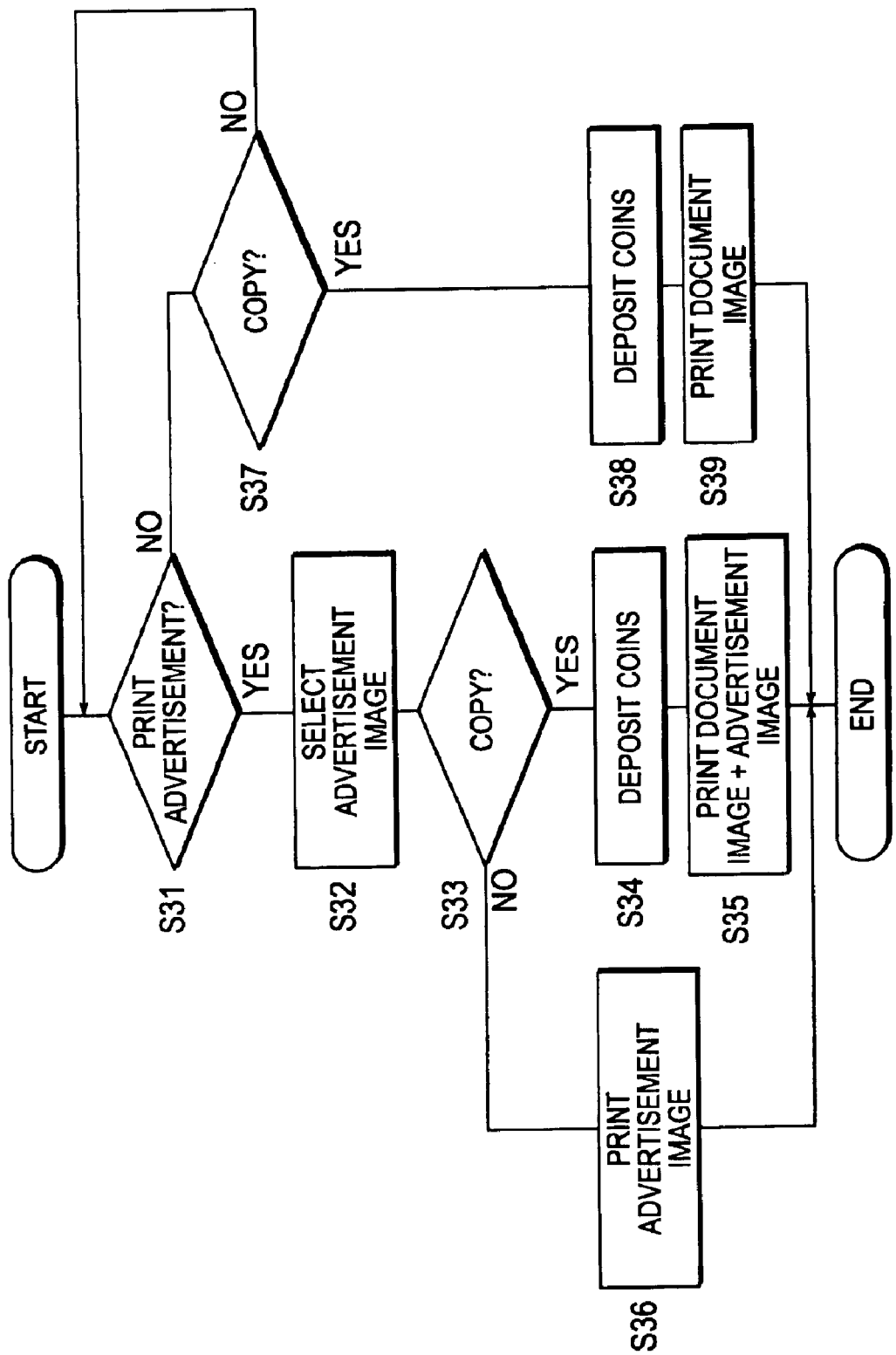
FIG. 7 is a flow chart for a fee control procedure based on the complexity of an advertisement selected by the user.

Let us describe now the control procedure for altering the fee based on how complex are the contents of the advertisement selected by the user referring to FIG. 7. The fees charged to the user and the advertiser are determined and altered according to how complex are the contents of the advertisement image to be printed. Moreover, the fees to the user and the advertiser are determined and altered depending also on whether the mode is to print only the advertisement image without printing the document image.

Figure 8:
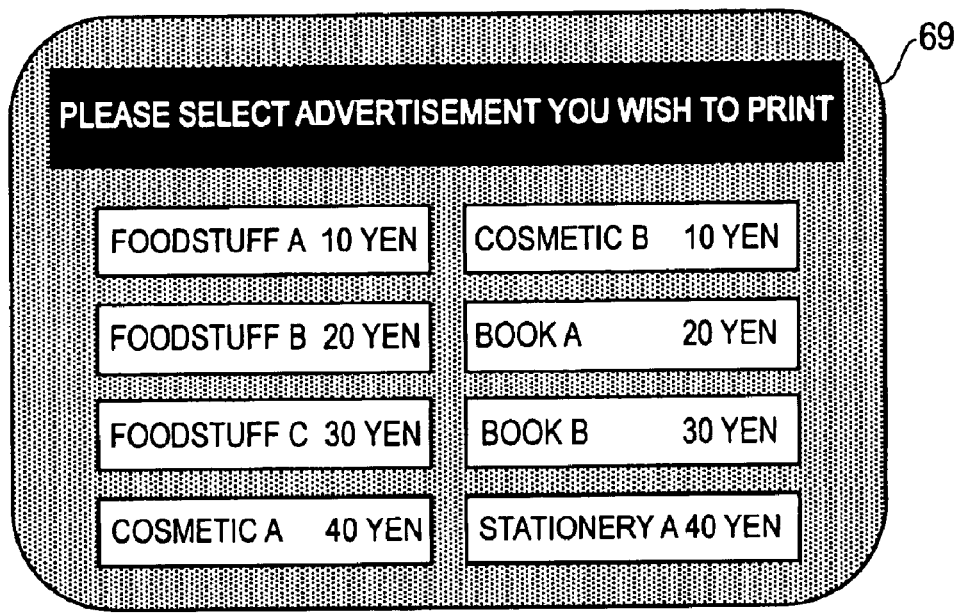
FIG. 8 and FIG. 9 are drawings showing displays of the operating panel displaying lists of various advertisements that can be printed.

When the user selects the advertisement printing, the display unit 69 of the operating panel 18 displays a list of advertisements that can be printed as shown in FIG. 8. First, let us describe about the display of the list of advertisements. The list of advertisements contain texts that represent the kinds of the items being advertised such as "Foodstuff A" and "Foodstuff B" as well as the prices such as "10 yen" and "20 yen" corresponding to the kinds of the advertised items. The information needed to display the list of the advertised items is stored in the advertisement image memory 63. The displayed prices represent the copying fees that are charged to the user when the corresponding advertisements are printed. When the advertisement is not printed, the copying fee charged to the user is set, for example, at 50 yen a copy. On the other hand, when the advertisement is printed, the copying fee charged to the user varies with the advertisement as shown in FIG. 8. For example, when the advertisement of "Foodstuff A" provided by Foodstuff Company A is to be printed, the user will be charged with 10 yen a copy and when the advertisement of "Foodstuff B" provided by Foodstuff Company B is to be printed, the user will be charged with 20 yen a copy. In the meantime, the advertiser of "Foodstuff A" (Foodstuff Company A) will be charged 40 yen a copy to counter the user's copying fee reduction as the advertisement fee, and the advertiser of "Foodstuff B" (Foodstuff Company B) will be charged 30 yen a copy for the same reason. The fees that are dependent on the complexity of the advertisement images are stored in the fee charging table memory 72 as the second fee table.

Such a fee distribution to the user and the advertiser depends on the complexity of the advertisement contents. An advertisement which reduces the copying fee, i.e., an advertisement which increases the advertisement fee, has more complex contents. For example, if the number of pages of the advertisement is larger or the advertisement image is larger, the contents of the advertisement can be presented in more details, thus increasing the advertisement effect. In such a case, the fee to the advertiser is larger. In the examples given above, Foodstuff Company A is charged 40 yen while Foodstuff Company B is charged only 30 yen, so that the advertisement of "Foodstuff A" is more complex than "Foodstuff B." Also, since Food Company A that bears a higher fee, it offers a lower copying fee to the user, so that there is a good chance for the "Foodstuff A" advertisement being selected for printing with the user's copy. The higher the chance of it being printed, the greater the effect of the "Foodstuff A" advertisement becomes. The fee to the advertiser is thus altered according to the achievable advertisement effect, so that the fairness among advertisers can be maintained.

On the other hand, if the number of pages of the advertisement is larger, the user suffers a drop in the copying productivity and the time the advertiser occupies the copying machine 11 increases. Therefore, a fee distribution between the user and the advertiser can be maintained by reducing the user's fee and increasing the advertiser's fee by the same amount as the contents of the advertisement become more complex.

In reference to FIG. 7, the user can select the advertisement printing by operating the keys of the advertisement function selection unit 62. When the advertisement printing is selected (S31 "YES"), the display unit 69 displays a list of advertisements that can be printed (refer to FIG. 8). The user selects an advertisement of the user's choice by pressing the corresponding key from this list (S32). The discriminating unit 68 determines whether the contents of the advertisement to be printed are complex. The information on the selections whether an advertisement is to be printed and which advertisement is to be printed (whether the contents of the advertisement to be printed are complex) is sent from the copying machine 11 to the fee charging device 12. As to the selection of the advertisement, it is possible to select only one kind of advertisement or to select multiple advertisements simultaneously.

When making copies (§33 "YES"), the user deposits coins in the fee charging device 12 (S34), and specifies the copying mode. When the user presses the start key, the document image and the selected advertisement image will be printed (S35). The printing format of the advertisement image will not be particularly limited. Either the white space, separate sheet or backside advertisement will be selected depending on the copy mode specified by the user and the size of the advertisement to be printed.

If the mode is selected for not copying documents and printing only advertisement images (S33 "NO"), the advertisement images will be printed without requiring the user to deposit any coins in the fee charging device 12 (S36). The fee to the user is zero in this mode and the fee is charged entirely to the advertiser.

In order to copy documents without printing advertisements (S31 "NO", S37 "YES"), the user deposits coins in the fee charging device 12 (S38), specifies the copy mode, and presses the start key to print document images (S39).

As described above, the advertiser will be charged for the advertisement effect achieved in proportion to the complexity of the contents of the advertisement to be printed, while the user is charged for a fee discounted by the same amount. Thus, fairness is maintained between advertisers and the active use of advertisement printing is promoted.

Moreover, the user can obtain only the advertisement information of the user's preference without copying documents. This means that the advertisement can be offered to people who do not wish to copy, thus expanding the usage of the image forming system 10 and increasing benefits to the users as well.

In printing advertisements, it is possible to provide a function for the copying machine 11 to select optimum advertisement images for the time zone and other factors, but the optimum advertisement images are to be essentially selected by the user. Since the advertisement to be printed is selected by the user him/herself (S32), the user can obtain the advertisement of his/her true choice. Thus, it provides effective advertisement effects for both the user and the advertiser.

[4. Fee Control Based on the Display Location of the List of Advertisements]

Let us describe now the control procedure for altering the fees based on the display location of the list of advertisements. The fees charged to the user and the advertiser for an advertisement are determined and altered according to the likeliness of being selected.

In general, when a person is selecting an item arbitrarily from multiple items displayed on a list, i.e., without a particular objective, it is known that the person tends to pick an item from the items shown in upper sections of the list.

If this rule is applied to this embodiment, it means that items arranged in upper sections of the list of items of printable advertisements displayed on the display unit 69 have more likeliness to be selected by the user. It is therefore preferable that the advertisers who display their advertisements in the upper sections should pay higher advertisement fees, i.e., more advertisers' investments, from the standpoint of maintaining fairness among multiple advertisers. The greater the advertiser's investments, the lower the copying fees to be charged to the users. This can be interpreted to increase the chance of the user who was able to make copies inexpensively would again select the same advertisement next time, so that the advertiser can fully benefit the advertisement effect from the investment.

Figure 9:
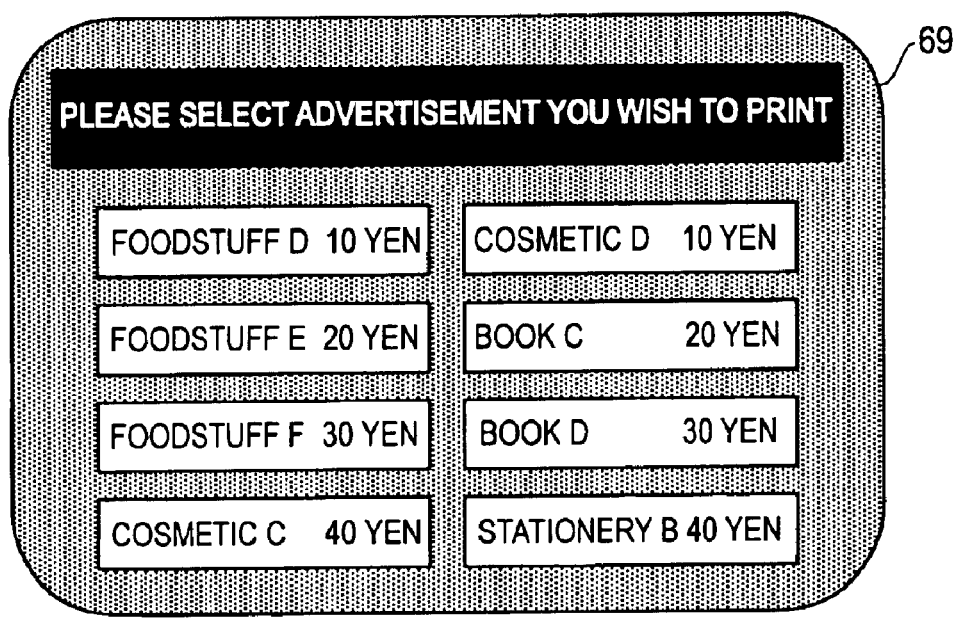

Therefore, as shown in FIG. 9, in displaying a list of printable advertisements on the display unit 69, advertisements associated with lower copying fees, i.e., higher advertisers' investments, are displayed in higher positions. More specifically, in the example shown, the advertisements are listed in four rows by two columns. The top row, or highest ranking row, contains "Foodstuff D 10 yen" and "Cosmetic D 10 yen" which are offered by the advertisers who invested most. The bottom row, or lowest ranking row, contains "Cosmetic C 40 yen" and "Stationery B 40 yen" which are offered by the advertisers who invested least.

The prices shown are the copying fees to be charged to the user. When the advertisement is not printed, the copying fee charged to the user is set, for example, at 50 yen a copy. On the other hand, if an advertisement is printed, the copying fee charged to the user is altered according to the advertisement. For example, the copying fee of 10 yen will be charged to the user when the advertisement of "Foodstuff D" is printed, while 40 yen will be charged to the user when the advertisement of "Cosmetic C" is printed. In the meantime, the copying fee discount, 40 yen, will be charged to the advertiser of "Foodstuff D" as the advertisement fee, and 10 yen will be charged to the advertiser of "Cosmetic C" similarly.

The fee control is executed according to the display location of the advertisement determined by the discriminating unit 68. Since the procedure is the same as the one indicated in the flow chart shown in FIG. 7, further indication of a flow chart or description are not repeated here.

Based on the display positions of the list of advertisements, advertisers are charged with advertisement fees commensurate with the advertisement effects, while the users who select the advertisements with higher advertisers' investments are charged less. Thus, higher advertisement effects and more active use of advertisement printing can be achieved. Moreover, fairness among advertisers can be achieved as the advertisers are charged commensurate with the advertisement effects.

[5. Fee Control Based on the Combination of Color Mode]

Figure 10A:
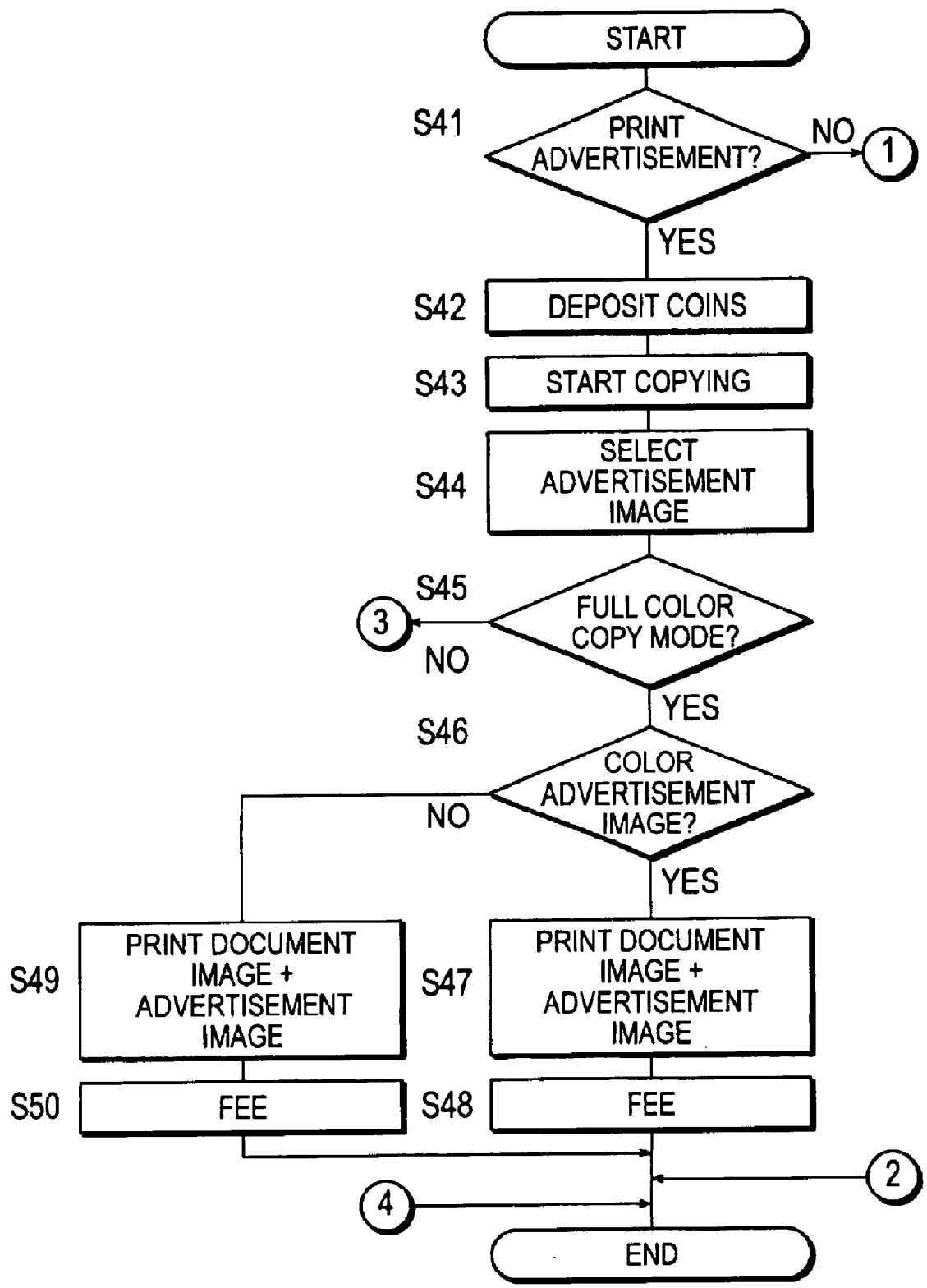
FIG. 10A through FIG. 10C are flow charts for fee control procedures based on the combination of the color mode of the document copy and the color mode of the advertisement image.
Figure 10B:
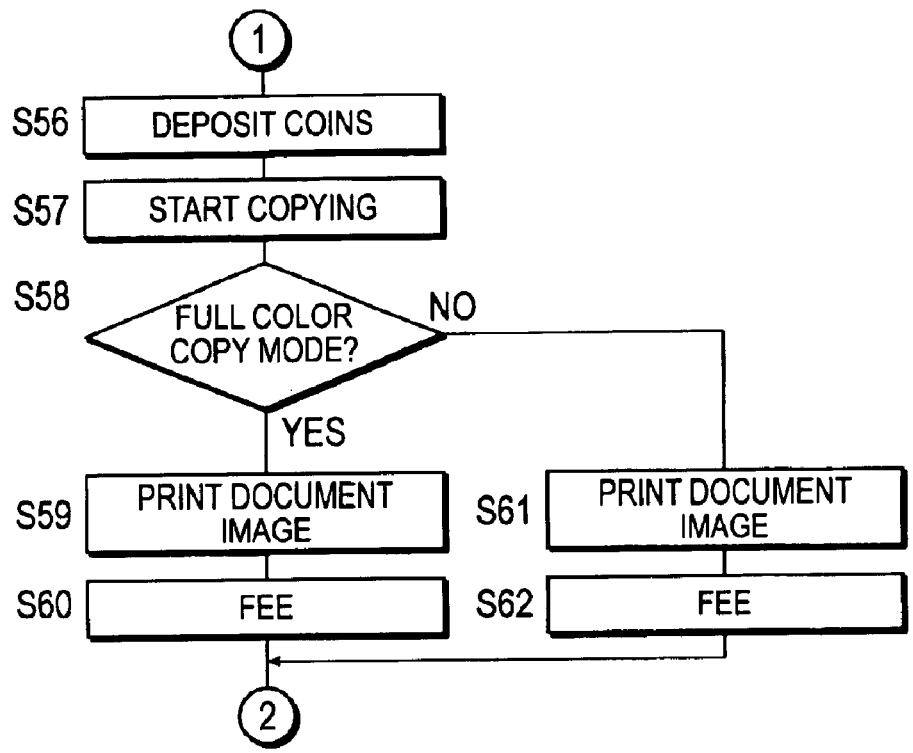
Figure 10C:
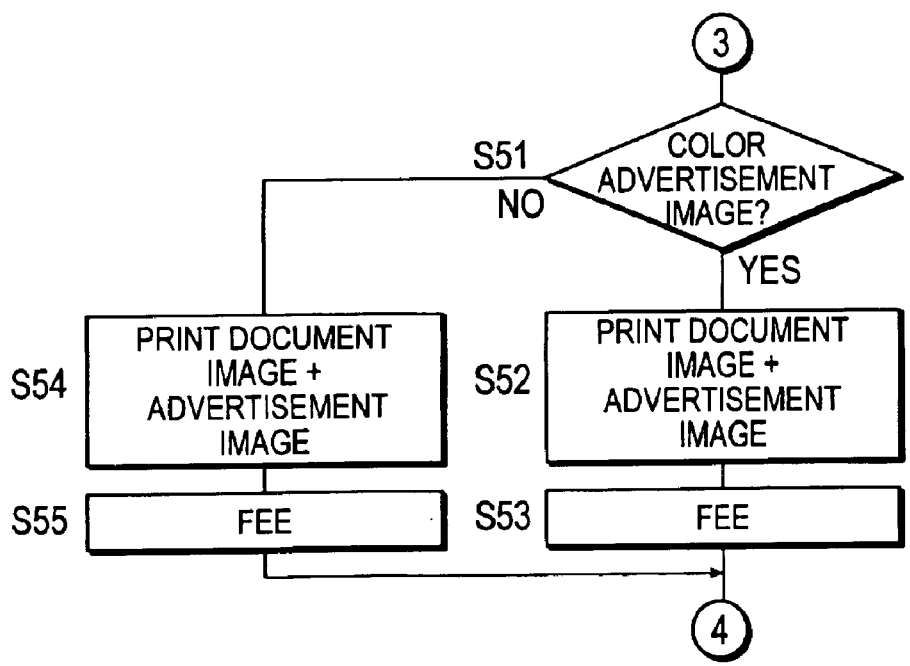

Let us describe now the control procedure for altering the fees based on the combination of the color mode of the document copy and the color mode of the advertisement image referring to flow charts shown FIG. 10A through FIG. 10C. The fees charged to the user and the advertiser for an advertisement are determined and altered according to whether the particular combination causes any copying productivity reduction. The description refers to an example where the printing format is a white space advertisement.

The user can select the advertisement printing by operating the keys of the advertisement function selection unit 62. The information whether any advertisement is going to be printed is sent from the copying machine 11 to the fee charging device 12. If the advertisement printing is selected (S41 "YES"), and the user deposits coins in the fee charging device 12 (S42) to start copying (S43), an advertisement image will be selected from multiple advertisement images stored in the advertisement image memory 63 (S44). The advertisement image can be automatically selected in rotation by the control unit 61 or by the user's arbitrary choice. The advertisement image can be either a full color image or a monochromatic image.

Next, the control unit 61 determines whether the color mode specified by the user for the document copy is the full color mode or the monochromatic mode (S45). Moreover, the control unit 61 determines whether the color mode of the selected advertisement image is the full color mode or the monochromatic mode (S46, S51).

The discriminating unit 68 determines the combination of the color mode of the document copy and the advertisement image. The control unit 61 adds the advertisement image to the document image depending on the combination of the determined color modes and executes the white space advertisement printing. More specifically, both the document image and the advertisement image will be printed in full color in case of a combination of the full color copy mode ant the full color advertisement image (S45 "YES", S46 "YES", S47). In case of a combination of the full color copy mode and the monochromatic advertisement image, the document image will be printed in full color and the advertisement image will be printed monochromatically (S45 "YES", S46 "NO", S49). In case of a combination of the monochromatic copy mode and the full color advertisement image, the document image will be printed monochromatically and the advertisement image in full color (S45 "NO", S51 "YES", S52). In case of a combination of the monochromatic copy mode and the monochromatic advertisement image, both the document image and the advertisement image will be printed monochromatically (S45 "NO", S51 "NO", S54).

In case of copying documents without advertisement (S41 "NO"), when the user deposits coins in the fee charging device 12 (S56) and starts copying (S57), the control unit 61 determines the color mode of the document copy (S58). If the full color copy mode is specified at this time, the document image will be printed in full color (S58 "YES", S59); if the monochromatic copy mode is specified, the document image will be printed monochromatically (S58 "NO", S61).

When either of these printing operation (S47, S49, S52, S54, S59 or S61) is completed, a fee will be charged (S48, S50, S53, S55, S60 or S62).

The copying fee to the user is collected by the fee charging device 12. The advertisement fee to the advertiser is stored aggregately in the fee charging memory 64 and will be invoiced later to the advertiser as a lump sum. An example of the fees according to the combinations of the color modes is shown in FIG. 11. Such fees are stored as the third fee table in the fee charging table memory 72.

When the advertisement is not printed as shown in FIG. 11, the copying fee for the full color copy mode is set, for example, as 50 yen per copy (cell E of the figure) and the copying fee for the monochromatic copy mode is set, for example, as 20 yen per copy (cell F of the figure).

The fees for the combination of the full color copy mode and the full color advertisement image (cell A of the figure) and the combination of the full color copy mode and the monochromatic advertisement image (cell C of the figure) are 40 yen per copy both to the user and 10 yen to the advertiser. In these cases, the fee distribution ratio between the user and the advertiser stays the same. This is because the user selected full color printing for the document copy, so that no copying productivity drop does not occur regardless of the advertisement printing mode. In other words, four cycle type copying machine 11 shown in FIG. 3 can produce white space advertisements in both full color or monochromatic images within the operating range of the full color copying mode specified by the user without causing any extra burden to such devices as the developing device 39 and the transfer drum 37.

In case of the combination of the monochromatic copy mode and the monochromatic advertisement image (cell D of the figure), the fees are 10 yen per copy both to the user and the advertiser. In case of the combination of the monochromatic copy mode and the full color advertisement image (cell B of the figure), the fees are 7 yen per copy to the user and 23 yen per copy to the advertiser. The reason the copying fee is lower in this case is that the user has to wait for the full color advertisement image is formed despite the fact that the user selected the monochromatic copying mode and the copying productivity can be reduced. In other words, full color advertisement images cannot be printed within the operating range of the monochromatic copy mode specified by the user, and it is necessary to operate developers (CMY) in addition to the black developer, which are not necessary in the monochromatic copying mode, and requires extra operations of the transfer drum 37 and the transfer belt in case of four cycle the copying machine 11. The reason for raising the advertiser's fee in case of the full color advertisement image is that it requires more image forming equipment (for example, the developing device 39, the transfer drum 37, etc.) and printing materials (toner, electric power, etc.) compared to the monochromatic advertisement image. It is also due to the fact that the portion of the user's fee that is discounted is added to the advertiser's fee. Moreover, since the full color advertisement image is formed within the monochromatic document image, the advertisement effect is higher as the attention of the user is attracted to the full color advertisement's image.

Thus, the copying fee is reduced in cases of, among various combinations of the color mode of the advertisement image and the color mode of the document copy, those combinations that cause reductions of the copying productivity, so that active uses of the advertisement printing can be promoted.

[16. Fee Control Based on the Toner Consumption in the Advertisement Image Printing]

Figure 12:
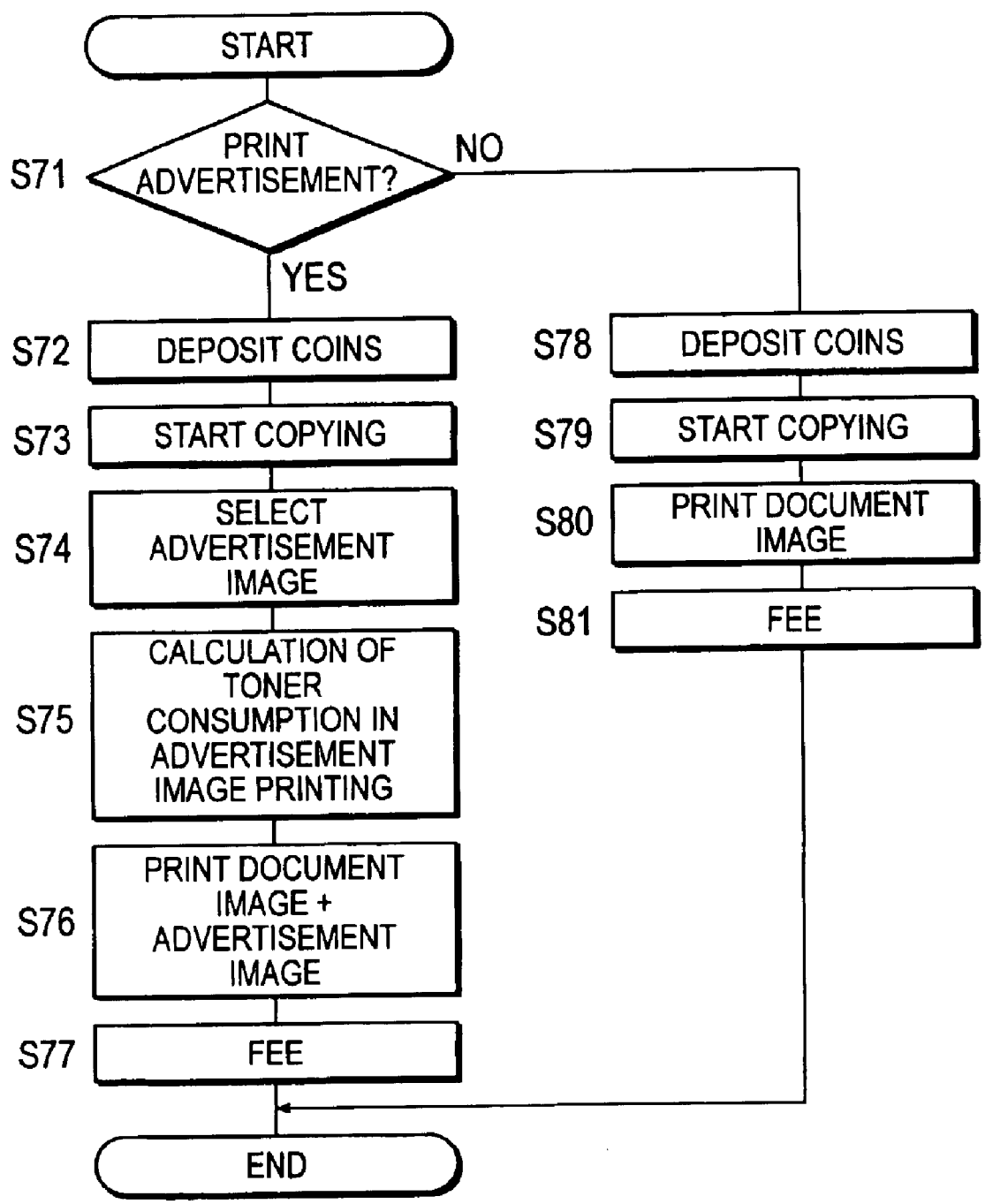
FIG. 12 is a flow chart for a fee control procedure that alters the advertiser's fee based on the amount of toner used in printing the advertisement image.

Let us describe now the control procedure for altering the fee based on the toner consumption in the advertisement image printing referring to the flow chart shown FIG. 12. The fee charged to the advertiser is determined and altered based on the amount of toner required for printing the advertisement image. The description refers to an example where the printing format is a white space advertisement.

The user can select the advertisement printing by operating the keys of the advertisement function selection unit 62. The information whether any advertisement is going to be printed is sent from the copying machine 11 to the fee charging device 12. If the advertisement printing is selected (S71 "YES"), and the user deposits coins in the fee charging device 12 (S72) to start copying (S73), an advertisement image will be selected from multiple advertisement images stored in the advertisement image memory 63 (S74). The advertisement image is automatically selected in rotation by the control unit 61. The advertisement image is a full color image.

The toner consumption detection unit 80 detects the amount of toner used by the advertisement image (S75). The toner consumption can be calculated, for example, by adding concentration data per each pixel by means of a dot counter based on the concentration data included in the digital image signal. The calculation of the toner consumption by means of this dot counter is generally used in determining the toner amount to be supplied to the hopper of the developer.

The reason for calculating the toner consumption is as follows: Whether the advertisement image is printed in full color or monochromatic color depends on the color mode (full color copy mode or monochromatic copy mode) of the document copy specified by the user, and the toner consumption is dependent on the mode. For example, if the user specifies the monochromatic copy mode, the white space advertisement becomes monochromatic also, so that its toner consumption is less than in the case of full color printing. Therefore, it is reasonable and fair to alter the fee depending on the consumption of the toner, which varies with the color mode specified by the user, rather than determining the fee unanimously to all advertisers based on the assumption that the full color advertisement image will be printed. Moreover, it is preferable to do so from the viewpoint of achieving fairness among multiple advertisers. In the above case, a smaller fee in proportion to the reduction of the toner consumption will be charged to the advertiser.

On the other hand, the copying fee to be charged to the user is set to the same fee regardless of the toner consumption for the document image printing. The reason is that an average toner consumption is determined statistically from various types of documents to be printed by a large number of users, and the copying fee is determined based on this average toner consumption. Another reason is that a coin vendor is used as the fee charging device 12 and it is impossible to alter the fee minutely in relation to the types of coins used.

When the calculation of the toner consumption for the advertisement image printing is completed, the document image and the advertisement image are printed (S76), the fees are charged to the user and the advertiser respectively (S77). The discriminating unit 68 determines the toner unit price based on the detected toner consumption. It is possible to alter the toner unit price by classifying the toner consumption to several ranks. The copying fee to be charged to the user is collected by the fee charging device 12, and the advertisement fee to the advertiser is stored aggregately in the fee charging memory 64 and will be invoiced later to the advertiser as a lump sum. Since the invoice will be sent to the advertiser periodically in aggregate amounts, minute fee calculation by the control unit 71 based on the toner consumption does not cause any problem in invoicing the advertisement fee.

In case of copying documents, without printing advertisements (S71 "NO"), the user deposits coins into the fee charging device 12 (S78) and starts printing (S79) as usual. Document images will be printed (S80) and the copying fee will be collected (S81).

As a result, since the fee commensurate with the toner consumption is charged to the advertiser, the fee is a fair one and fairness among multiple advertisers can be achieved.

It is obvious that this invention is not limited to the particular embodiments shown and described above but may be variously changed and modified without departing from the technical concept of this invention.

What is claimed is:

1. An image forming system comprising:
   a printing unit for forming additional images in addition to document images;
   a mode selection unit for selecting an additional image mode that forms only the additional images without printing any document images; and
   a control unit for charging fees only to providers of the additional images when the additional image mode is selected at said mode selection unit.

2. An image forming apparatus comprising:
   an image forming unit for forming images on a sheet,
   a selecting unit for selecting between the first print mode for printing only document images and the second print mode for printing the document images and additional images,
   a print controller for controlling the image forming unit so as to print images in conformity with the print mode selected by the selecting unit, and
   a control unit for placing a charge for printing the document images and, in the case of the second print mode, further charging fees to a provider of the additional images and, in the case of the second print mode, altering the ratio of the charge imposed on the provider of the additional images and the charge for printing the document images, depending on times required for printing the additional images.

3. An image forming apparatus according to claim 2, in which the second print mode causes the additional images to be printed in the white space of the document images.

4. An image forming apparatus according to claim 2, in which the second print mode causes the additional images to be printed on the backside of the sheet where the document images are printed.

5. An image forming apparatus according to claim 2, in which the second print mode causes the additional images to be printed on a sheet separate from the sheet where the document images are printed.

6. An image forming apparatus according to claim 2, in which the control unit in the case of the second print mode lowers the ratio of the charge for printing the document images to the charge for the provider of the additional images in accordance with the times required for printing the additional images are longer.

7. An image forming device according to claim 2, in which the selecting unit is further adapted to select the third print mode for printing only the additional images and the control unit sets the charge for printing the document images at a lower level in the case of the second print mode than in the case of the first print mode and at a lower level in the case of the third print mode than in the case of the second print mode.

8. A method for charging a fee in an image forming apparatus for printing images on a sheet comprising:
   a step of selecting between the first mode for obtaining a printed image exclusively of document images and the second mode for obtaining a printed image having additional images added to the document images; and
   a step of charging a first fee to the print of the document images when the first mode is selected and a second fee smaller than the first fee when the second mode is selected.

9. A method according to claim 8, in which a provider of the additional images is charged with a fee when the charging step selects the second mode.

10. A method according to claim 9, in which the ratio of the second fee to the charge to the provider of the additional images is decreased in accordance with times required for printing the additional images are longer when the charging step selects the second mode.

* * * * *